United States Patent
Kim et al.

(10) Patent No.: US 8,730,402 B2
(45) Date of Patent: May 20, 2014

(54) ANALOG FRONT END FOR DTV, DTV SYSTEM HAVING THE SAME, AND OPERATION METHODS THEREOF

(75) Inventors: Sang Ho Kim, Suwon-si (KR); Ho Jin Park, Suwon-si (KR); Hyung Woan Koo, Hwaseong-si (KR); Ki Ho Lee, Hwaseong-si (KR)

(73) Assignee: Samsung Electronics Co., ltd., Suwon-Si (KR)

( * ) Notice: Subject to any disclaimer, the term of this patent is extended or adjusted under 35 U.S.C. 154(b) by 0 days.

(21) Appl. No.: 13/450,035

(22) Filed: Apr. 18, 2012

(65) Prior Publication Data

US 2012/0268657 A1    Oct. 25, 2012

(30) Foreign Application Priority Data

Apr. 21, 2011   (KR) .................. 10-2011-0037515
Apr. 21, 2011   (KR) .................. 10-2011-0037516

(51) Int. Cl.
*H04N 5/455* (2006.01)

(52) U.S. Cl.
USPC ........... 348/726; 348/725; 348/572; 348/727; 348/728

(58) Field of Classification Search
USPC .......................... 348/725–738, 572; 341/141
See application file for complete search history.

(56) References Cited

U.S. PATENT DOCUMENTS

| | | | |
|---|---|---|---|
| 4,016,557 A * | 4/1977 | Zitelli et al. ................. 341/139 |
| 6,108,046 A * | 8/2000 | Wu et al. ...................... 348/558 |
| 7,250,987 B2 | 7/2007 | Goyal et al. |
| 2006/0001779 A1 * | 1/2006 | Favrat et al. .................. 348/725 |
| 2006/0116098 A1 * | 6/2006 | Oba et al. ...................... 455/313 |
| 2006/0176201 A1 * | 8/2006 | Kimura et al. ................ 341/144 |
| 2006/0223476 A1 | 10/2006 | Song et al. |
| 2007/0116147 A1 | 5/2007 | May et al. |
| 2007/0268405 A1 | 11/2007 | Arbel et al. |
| 2008/0225176 A1 * | 9/2008 | Selby et al. ................... 348/572 |
| 2009/0021643 A1 * | 1/2009 | Hsueh et al. .................. 348/572 |
| 2009/0219204 A1 | 9/2009 | Yoo et al. |
| 2009/0244384 A1 * | 10/2009 | Takamori et al. ............. 348/572 |
| 2009/0268094 A1 * | 10/2009 | Lin et al. ....................... 348/572 |
| 2010/0110307 A1 | 5/2010 | Lene et al. |
| 2011/0235758 A1 * | 9/2011 | Khoini-Poorfard et al. .. 375/345 |
| 2013/0058437 A1 * | 3/2013 | Oshima et al. ................ 375/316 |
| 2013/0101006 A1 * | 4/2013 | Mombers et al. ............. 375/226 |

FOREIGN PATENT DOCUMENTS

JP      2003134411 A    5/2003
KR    1020060104561 A    10/2006

* cited by examiner

*Primary Examiner* — Jefferey Harold
*Assistant Examiner* — Humam Satti
(74) *Attorney, Agent, or Firm* — Sughrue Mion, PLLC

(57) ABSTRACT

Provided is an analog front end of a digital TV, a digital TV system having the same, and a method of operating the same. The analog front end includes: a first selection circuit which selectively outputs differential sound intermediate frequency signals or differential TV broadcast signals in response to a first selection signal; a second selection circuit which outputs a clock signal among a plurality of clock signals having a different sampling frequencies, in response to a second selection signal; and an analog-to-digital converter which converts output signals output from the first selection circuit to a digital code, according to a sampling frequency of a clock signal output from the second selection circuit.

22 Claims, 10 Drawing Sheets

ANALOG FRONT END FOR DTV, DTV SYSTEM HAVING THE SAME, AND OPERATION METHODS THEREOF

CROSS-REFERENCE TO RELATED APPLICATIONS

This application claims priority under 35 U.S.C. §119(a) from Korean Patent Application Nos. 10-2011-0037515, filed on Apr. 21, 2011 in the Korean Intellectual Property Office, and 10-2011-0037516, filed on Apr. 21, 2011 in the Korean Intellectual Property office, the disclosures of which are hereby incorporated by reference in their entireties.

BACKGROUND

Apparatuses and methods consistent with exemplary embodiments relate to an analog front end (AFE), and more particularly, to an analog front end (AFE) of a digital television (DTV) that may selectively process a sound intermediate frequency signal, differential DTV broadcast signals, and differential analog TV broadcast signals, a DTV system having the AFE, and operation methods thereof.

Digital televisions (DTVs) refer to a broadcasting system for broadcasting and receiving video and audio by digital signals, in contrast to televisions using analog signals. The DTV uses data that is compressed and modulated in a digital method so that the data may be watched through television sets or set-top boxes designed for DTV.

The DTV has some merits over the analog televisions, including that a bandwidth used by a channel may be reduced. Also, multicasting, that is, a function to broadcast various programs on a single channel at the same time, and an electric program guide (EPG) are available in the DTV.

SUMMARY

Aspects of one or more exemplary embodiments provide an analog front end of a digital television (DTV) that may selectively process a sound intermediate frequency signal, differential DTV broadcast signals, and differential analog TV broadcast signals, according to an operation mode, a DTV system having the analog front end, and operation methods thereof.

According to an aspect of an exemplary embodiment, there is provided an analog front end (AFE) of a digital TV processing system, the AFE including: a first selection circuit which outputs differential sound intermediate frequency signals or differential TV broadcast signals in response to a first selection signal; a second selection circuit which outputs a clock signal among a plurality of clock signals having different sampling frequencies, in response to a second selection signal; and an analog-to-digital converter which converts the output signals output from the first selection circuit to a digital code, according to a sampling frequency of the output clock signal output from the second selection circuit.

According to an aspect of another exemplary embodiment, there is provided a digital TV processing system including: a tuner which generates at least one of a single-ended sound intermediate frequency signal and differential TV broadcast signals from radio frequency signals; an analog front end (AFE) which selectively processes the generated single-ended sound intermediate frequency signal and the generated differential TV broadcast signals; and a demodulator which demodulates a digital code output from the AFE, wherein the AFE includes: a first selection circuit which outputs differential sound intermediate frequency signals generated based on the generated single-ended sound intermediate frequency signal or the generated differential TV broadcast signals, in response to a first selection signal; a second selection circuit which outputs a clock signal among a plurality of clock signals having different sampling frequencies, in response to a second selection signal; and an analog-to-digital converter which converts the output signals output from the first selection circuit to the digital code, according to a sampling frequency of the output clock signal output from the second selection circuit.

According to an aspect of another exemplary embodiment, there is provided a signal processing circuit including: an analog-to-digital converter which converts differential analog signals to a digital code, in response to a sampling clock signal; a fractional-N phase locked loop (PLL) which receives a clock signal as an input clock signal; and a first selector which selectively outputs one of the clock signal and an output clock signal output from the fractional-N PLL as the sampling clock signal, in response to a first selection signal.

According to an aspect of another exemplary embodiment, there is provided a digital TV processing system including: an analog front end (AFE) which converts differential TV broadcast signals to a digital code according to a sampling clock signal; and a demodulator which demodulates the digital code, wherein the AFE includes: an analog-to-digital converter which converts differential analog signals to the digital code, in response to the sampling clock signal; a fractional-N phase locked loop which receives a clock signal as an input clock signal; and a first selector which selectively outputs one of the clock signal and an output clock signal output from the fractional-N phase locked loop as the sampling clock signal, in response to a first selection signal.

According to an aspect of another exemplary embodiment, there is provided a signal processing method of a digital TV processing system, the signal processing method including: selectively outputting differential sound intermediate frequency signals or differential TV broadcast signals in response to a first selection signal; outputting a clock signal among a plurality of clock signals having different sampling frequencies, in response to a second selection signal; and converting the output signals output from the selectively outputting to a digital code, according to a sampling frequency of the output clock signal.

According to an aspect of another exemplary embodiment, there is provided a signal processing method including: converting differential analog signals to a digital code, in response to a sampling clock signal; receiving, by a fractional-N phase locked loop (PLL), a clock signal as an input clock signal; and selectively outputting, by a first selector, one of the clock signal and an output clock signal output from the fractional-N PLL as the sampling clock signal, in response to a first selection signal.

According to an aspect of another exemplary embodiment, there is provided a method of manufacturing an analog front end (AFE) of a digital TV processing system, the method including: providing, in a first region of a semiconductor substrate, a first selection circuit for outputting differential sound intermediate frequency signals or differential TV broadcast signals in response to a first selection signal; providing, in a second region of the semiconductor substrate, a second selection circuit for outputting a clock signal among a plurality of clock signals having different sampling frequencies, in response to a second selection signal; and providing, in a third region of the semiconductor substrate, an analog-to-digital converter for converting the output signals output from the first selection circuit to a digital code, according to a sampling frequency of the output clock signal output from the second selection circuit.

BRIEF DESCRIPTION OF THE DRAWINGS

Exemplary embodiments will be more clearly understood from the following detailed description taken in conjunction with the accompanying drawings in which.

DETAILED DESCRIPTION OF EXEMPLARY EMBODIMENTS

Figure 1:
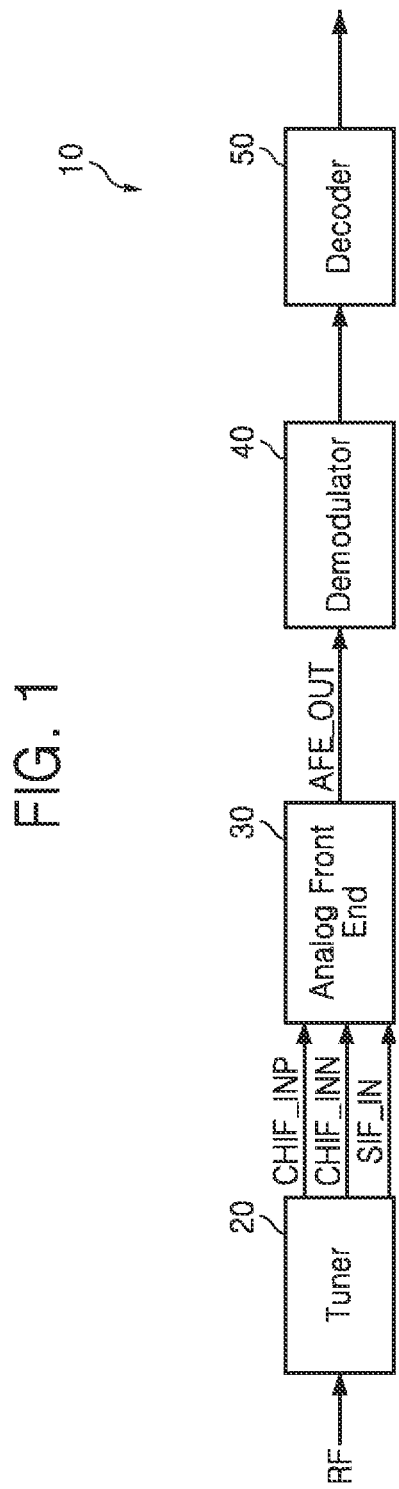
FIG. 1 is a block diagram schematically showing a digital television (DTV) system according to an exemplary embodiment.

The attached drawings for illustrating exemplary embodiments are referred to in order to gain a sufficient understanding of exemplary embodiments and the merits thereof. Hereinafter, exemplary embodiments will be described in detail with reference to the attached drawings, in which like reference numerals in the drawings denote like elements.

FIG. 1 is a block diagram schematically showing a digital television (DTV) system 10 according to an exemplary embodiment. Referring to FIG. 1, the DTV system 10 may be embodied by a satellite DTV system, a cable DTV system, a handheld DTV system, a terrestrial DTV system, etc. The DTV system 10 includes a high definition (HD) TV system, an image processing device, etc. The handheld DTV system may be embodied by mobile phones, smart phones, tablet personal computers (PCs), car navigation systems, personal digital assistants (PDAs), portable multimedia players (PMPs), etc.

The DTV system 10 may include a tuner 20, an analog front end (AFE) 30, a demodulator 40, and a decoder 50. According to various exemplary embodiments, the AFE 30, the demodulator 40, and the decoder 50 may be integrated in a single integrated circuit (IC), and the turner 20 may also be integrated in the single IC.

The tuner 20 includes appropriate circuits, logics, and/or codes, and may obtain radio frequency (RF) signals RF and generate a single-ended sound intermediate frequency signal SIF_IN and/or differential TV broadcast signals CHIF_INP and CHIF_INN from the RF.

The differential TV broadcast signals CHIF_INP and CHIF_INN may include differential digital TV broadcast signals, for example, DTV video signals and DTV sound intermediate frequency signals. Also, the differential TV broadcast signals CHIF_INP and CHIF_INN may include differential analog TV broadcast signals, for example, analog video signals and analog sound intermediate frequency signals.

According to an exemplary embodiment, the differential digital TV broadcast signals, that is, the DTV video signals and the DTV sound intermediate frequency signals, may be signals according to a digital video broadcasting (DVB) family that is a DTV standard in Europe, for example, DVB-S (satellite), DVB-T (terrestrial), DVB-C (cable), DVB-H (handheld), or DVB-SH (satellite services to handheld).

According to another exemplary embodiment, the differential digital TV broadcast signals, that is, the DTV video signals and the DTV sound intermediate frequency signals, may be signals corresponding to an advanced television system committee (ATSC) family that is a DTV standard in North America, for example, ATSC (terrestrial/cable) or ATSC-M/H (mobile/handheld).

According to still another exemplary embodiment, the differential digital TV broadcast signals, that is, the DTV video signals and the DTV sound intermediate frequency signals, may be signals appropriate for an integrated services digital broadcasting (ISDB) that is a DTV standard in Japan and Latin America, for example, ISDB-S (satellite), ISDB-T (terrestrial), ISDB-C (cable), and 1 seg (handheld). The 1 seg is mobile terrestrial digital sound intermediate frequency/video and data broadcasting services used in Japan, Chile, Peru, and Argentina.

According to still another exemplary embodiment, the differential digital TV broadcast signals, that is, the DTV video signals and the DTV sound intermediate frequency signals, may be signals satisfying ISDB-Tb (international system for digital broadcast, terrestrial, Brazilian version) that is a DTV standard in Brazil, Argentina, Chile, Peru, Venezuela, Bolivia, Ecuador, Costa Rica, and Uruguay.

According to still another exemplary embodiment, the differential digital TV broadcast signals, that is, the DTV video signals and the DTV sound intermediate frequency signals, may be signals satisfying China digital multimedia broadcasting-terrestrial/handheld (CDMB-T/H) or China mobile multimedia broadcasting (CMMB) that is a DTV standard in China.

According to still another exemplary embodiment, the differential digital TV broadcast signals, that is, the DTV video signals and the DTV sound intermediate frequency signals, may be signals satisfying terrestrial-digital multimedia broadcasting (T-DMB) or satellite-digital multimedia broadcasting (S-DMB) that is a DTV standard in Korea.

According to another exemplary embodiment, the differential analog TV broadcast signals, that is, the analog video signals and the analog sound intermediate frequency signals, may be signals appropriate for national television system committee (NTSC), phase alternating line (PAL), or sequential color with memory (SECAM).

The AFE 30 that may be integrated in a single chip may process, for example, analog-to-digital convert, the single-ended sound intermediate frequency signal SIF_IN or the differential TV broadcast signals CHIF_INP and CHIF_INN, and output a digital code AFE_OUT according to a processing result. The demodulator 40 may demodulate the digital code AFE_OUT output from the AFE 30, and the decoder 50 may decode the demodulated digital code demodulated by the demodulator 40.

Figure 2:
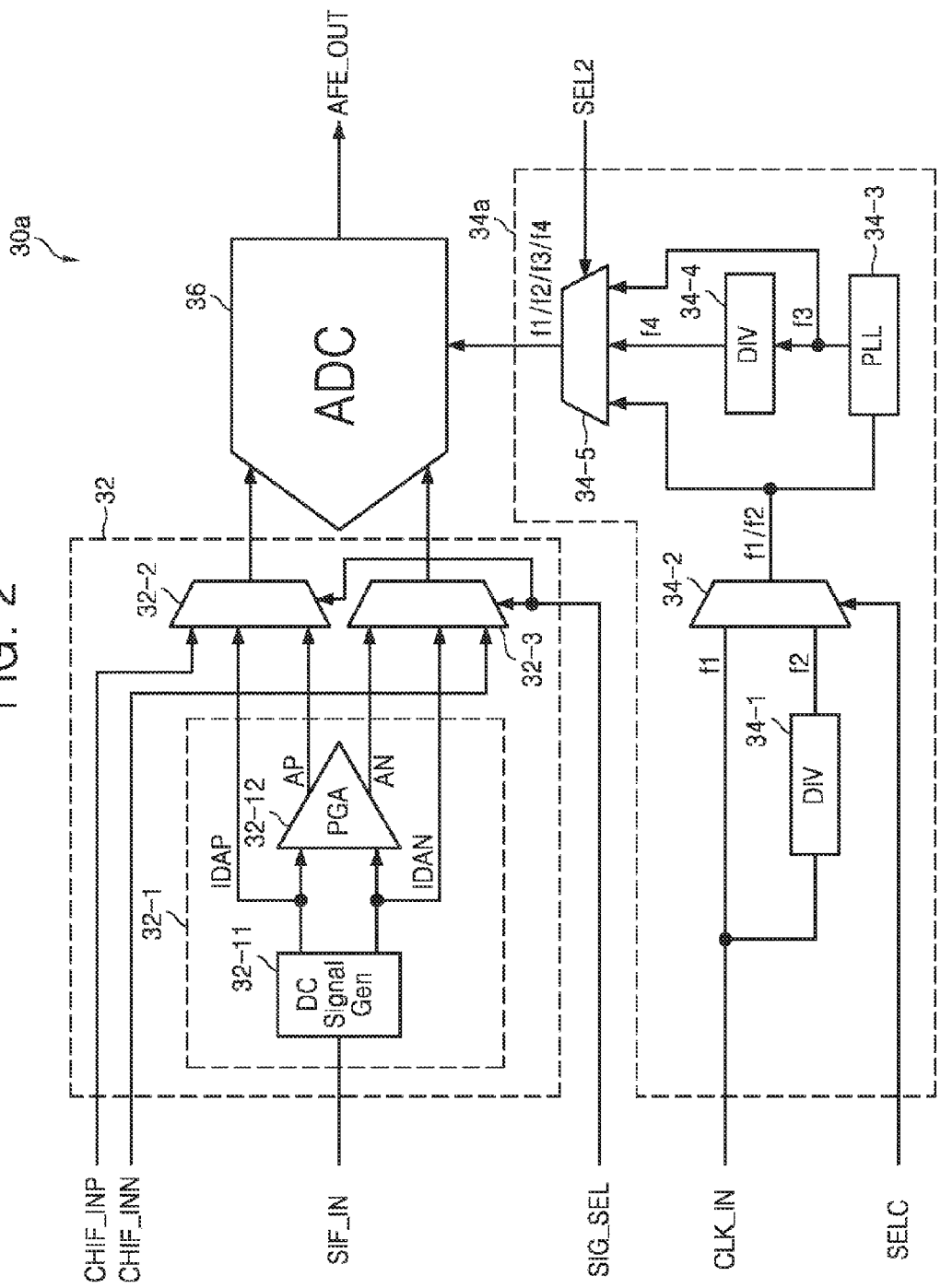
FIG. 2 is a block diagram of an analog front end of FIG. 1, according to an exemplary embodiment.

FIG. 2 is a block diagram of the AFE 30 of FIG. 1, according to an exemplary embodiment. Referring to FIGS. 1 and 2, the analog front end (AFE) 30a of FIG. 2 that is an exemplary embodiment of the AFE 30 of FIG. 1 includes a first selection circuit (or a first processing circuit) 32, a second selection circuit (or a second processing circuit) 34a, and an analog-to-digital converter (ADC) 36.

The first selection circuit 32, in response to a first selection signal SIG_SEL, selectively outputs the differential TV broadcast signals CHIF_INP and CHIF_INN or differential sound intermediate frequency signals AP and AN, or IDAP and IDAN, which are generated based on the single-ended sound intermediate frequency signal SIF_IN. The second selection circuit 34a, in response to a second selection signal SEL2, selectively outputs any one of a plurality of clock signals having different sampling frequencies f1, f2, f3, or f4, to the ADC 36.

The ADC 36 may convert the differential output signals of the first selection circuit 32 to a digital code AFE_OUT according to the sampling frequencies f1, f2, f3, or f4 of the clock signal selectively output by the second selection circuit 34a. The digital code AFE_OUT may be M bits where M is a natural number, for example, 10 or 12 (i.e., M=10 or M=12).

The first selection circuit 32 includes a single-to-differential converter 32-1, a first multiplexer 32-2, and a second multiplexer 32-3. The single-to-differential converter 32-1 converts the single-ended sound intermediate frequency signal SIF_IN to the differential sound intermediate frequency signals AP and AN, or IDAP or IDAN.

The single-to-differential converter 32-1 includes a direct current (DC) signal generator 32-11 and a programmable gain amplifier (PGA) 32-12.

The DC signal generator 32-11 sets a DC level on the single-ended sound intermediate frequency signal SIF_IN and outputs the first differential sound intermediate frequency signals IDAP and IDAN on which a DC level is set. The PGA 32-12 controls, for example, increases or decreases, gain of each of the first differential sound intermediate frequency signals IDAP and IDAN to output the differential sound intermediate frequency signals AP and AN. Any one (e.g., IDAP) of the first differential sound intermediate frequency signals IDAP and IDAN generated by the DC signal generator 32-11 is supplied to the first multiplexer 32-2, whereas the other one (e.g., IDAN) of the first differential sound intermediate frequency signals IDAP and IDAN is supplied to the second multiplexer 32-3.

Although FIG. 2 illustrates that the first differential sound intermediate frequency signals IDAP and IDAN are respectively supplied to input terminals of the first and second multiplexers 32-2 and 32-3, the first differential sound intermediate frequency signals IDAP and IDAN may not be respectively supplied to input terminals of the first and second multiplexers 32-2 and 32-3 in some exemplary embodiments.

The first multiplexer 32-2, in response to the first selection signal SIG_SEL, selectively outputs any one, for example, AP or IDAP, of the differential sound intermediate frequency signals AP and AN, or IDAP and IDAN, or any one, for example, CHIF_INP, of the differential TV broadcast signals CHIF_INP and CHIF_INN, to the ADC 36. The second multiplexer 32-3, in response to the first selection signal SIG_SEL, selectively outputs the other one, for example, AN or IDAN, of the differential sound intermediate frequency signals AP and AN, or IDAP and IDAN, or the other one, for example, CHIF_INN, of the differential TV broadcast signals CHIF_INP and CHIF_INN, to the ADC 36. The first selection signal SIG_SEL may include one or more bits.

For example, when the first selection circuit 32 is operated in a first operation mode in which the differential sound intermediate frequency signals AP and AN, or IDAP and IDAN, are output or processed, the first and second multiplexers 32-2 and 32-3, in response to the first selection signal SIG_SEL, output the differential sound intermediate frequency signals AP and AN, or IDAP and IDAN, having carrier frequencies of several megahertz (MHz), to the ADC 36. However, when the first selection circuit 32 is operated in a second operation mode in which the differential TV broadcast signals CHIF_INP and CHIF_INN are output or processed, the first and second multiplexers 32-2 and 32-3, in response to the first selection signal SIG_SEL, output the differential TV broadcast signals CHIF_INP and CHIF_INN, having carrier frequencies of tens of megahertz (MHz), to the ADC 36.

The second selection circuit 34a may include a first frequency divider 34-1, a third multiplexer 34-2, a phase locked loop (PLL) 34-3, and a fourth multiplexer 34-5. The first frequency divider 34-1 may divide the first frequency f1 of a source clock signal CLK_IN that is externally input by a division ratio K, where K is a real number, and generate a divided clock signal having the second frequency f2.

The third multiplexer 34-2, in response to a clock selection signal SELC, may selectively output the source clock signal CLK_IN and the divided clock signal output from the first frequency divider 34-1. The PLL 34-3 receives the clock signal output from the third multiplexer 34-2 as an input clock signal and outputs a low jitter PLL clock signal having the third frequency f3. The fourth multiplexer 34-5, in response to the second selection signal SEL2, selectively outputs the clock signal output from the third multiplexer 34-2 and the PLL clock signal output from the PLL 34-3. The clock selection signal SELC or the second selection signal SEL2 may include one or more bits.

In some exemplary embodiments, the second selection circuit 34a may further include a second frequency divider 34-4 embodied outside the PLL 34-3. The second frequency divider 34-4 may divide the third frequency f3 of the PLL clock signal output from the PLL 34-3 by a division ratio L, where L is a real number, and generate a divided clock signal having the fourth frequency f4. Thus, the fourth multiplexer 34-5 selectively outputs any one of a plurality of clock signals having different sampling frequencies f1, f2, f3, and f4, to the ADC 36, according to the second selection signal SEL2.

For example, in the first or second operation mode, the carrier frequency of the sampling frequencies f1, f2, f3, or f4 of the clock signal output from the second selection circuit 34 may be tens of megahertz (MHz). However, the carrier frequency of each sampling frequency f1, f2, f3, or f4 may vary according to design specifications.

As shown in FIGS. 1 and 2, a single AFE (30 or 30a) has an effect of selectively processing the single-ended sound intermediate frequency signal SIF_IN or the differential TV broadcast signals CHIF_INP and CHIF_INN according to an operation mode, for example, the first operation mode or the second operation mode.

Also, since the AFE 30a may generate the respective sampling frequencies f1, f2, f3, and f4 for sampling the single-ended sound intermediate frequency signal SIF_IN, the differential digital TV broadcast signals, or the differential analog TV broadcast signals according to various DTV standards, using the PLL 34-3 embodied inside, the AFE 30a has an effect of being commonly used for DTVs using the above-described various DTV standards. In some exemplary embodiments, a sampling clock signal output from the second selection circuit 34a may be provided as an operation clock signal of the demodulator 40 of FIG. 1.

Figure 3:
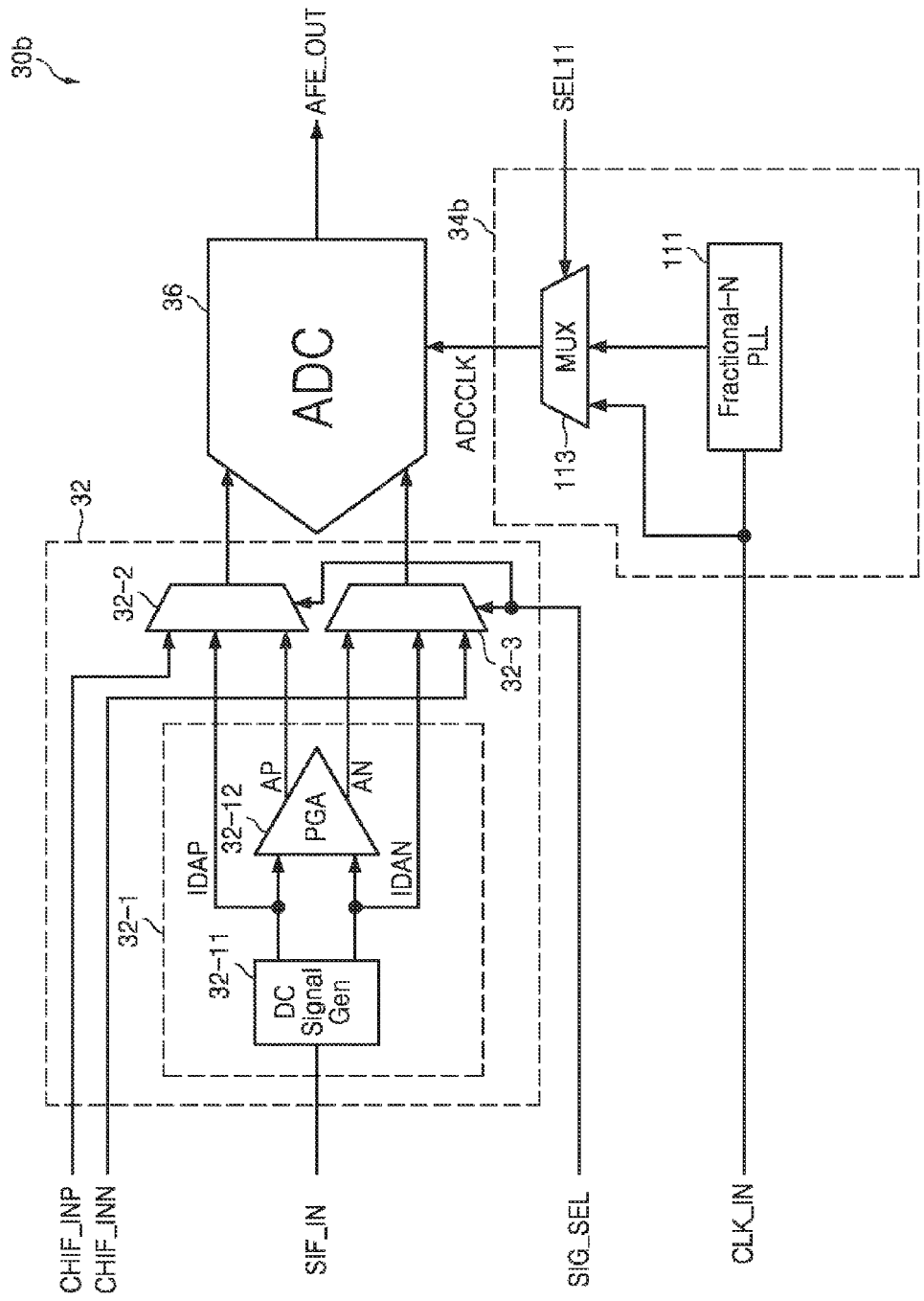
FIG. 3 is a block diagram of an analog front end of FIG. 1, according to another exemplary embodiment.

FIG. 3 is a block diagram of the AFE 30 of FIG. 1, according to another exemplary embodiment. Referring to FIGS. 2 and 3, except for a second selection circuit or second processing circuit 34b of FIG. 3, the structure of the AFE 30b of FIG. 3 is substantially the same as or similar to that of the AFE 30a of FIG. 2.

The second selection circuit 34b includes a fractional-N phase locked loop (PLL) 111 and a selection circuit 113. For example, the selection circuit 113 may be embodied by a multiplexer. The fractional-N PLL 111 that is used as an example of a frequency synthesizer may receive the source clock signal CLK_IN as an input clock signal and generate a clock signal. The fractional-N PLL 111 may not only reduce a lock-up time but also reduce phase noise.

The selection circuit 113, in response to a selection signal SEL11, outputs any one of the source clock signal CLK_IN and the clock signal output from the fractional-N PLL 111 as a sampling clock signal, to the ADC 36. For example, when the selection signal SEL11 is at a first level, for example, a low level, the selection circuit 113 may output the source clock signal CLK_IN. When the selection signal SEL11 is at a second level, for example, a high level, the selection circuit 113 may output the output clock signal of the fractional-N PLL 111.

The ADC 36 may convert the output signals CHIF_INP and CHIF_INN, AP and AN, or IDAP and IDAN of the first selection circuit 32 to a digital code AFE_OUT according to a sampling frequency of the clock signal selectively output by the second selection circuit 34b. In some exemplary embodiments, the sampling clock signal output from the second selection circuit 34b may be provided as an operation clock signal of the demodulator 40 of FIG. 1.

Figure 4:
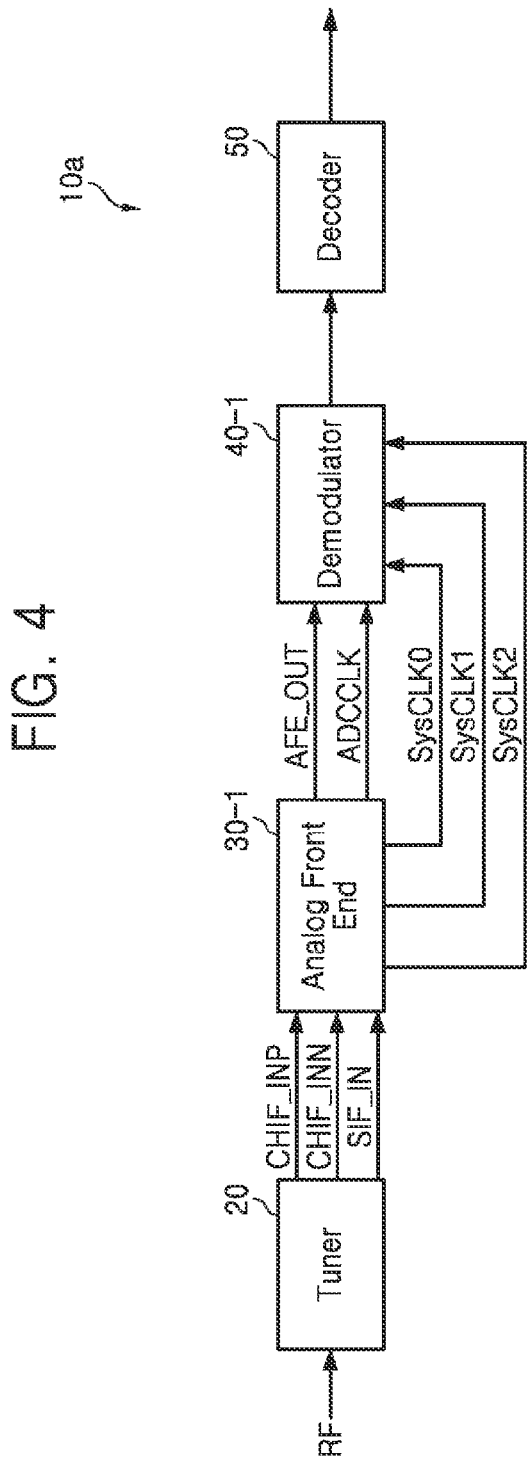
FIG. 4 is a block diagram schematically showing a DTV system according to another exemplary embodiment.

FIG. 4 is a block diagram schematically showing a DTV system 10a according to another exemplary embodiment. Referring to FIG. 4, the DTV system 10a is another example of the DTV system 10 of FIG. 1 and may include the tuner 20, an AFE 30-1, a demodulator 40-1, and the decoder 50.

Figure 6:
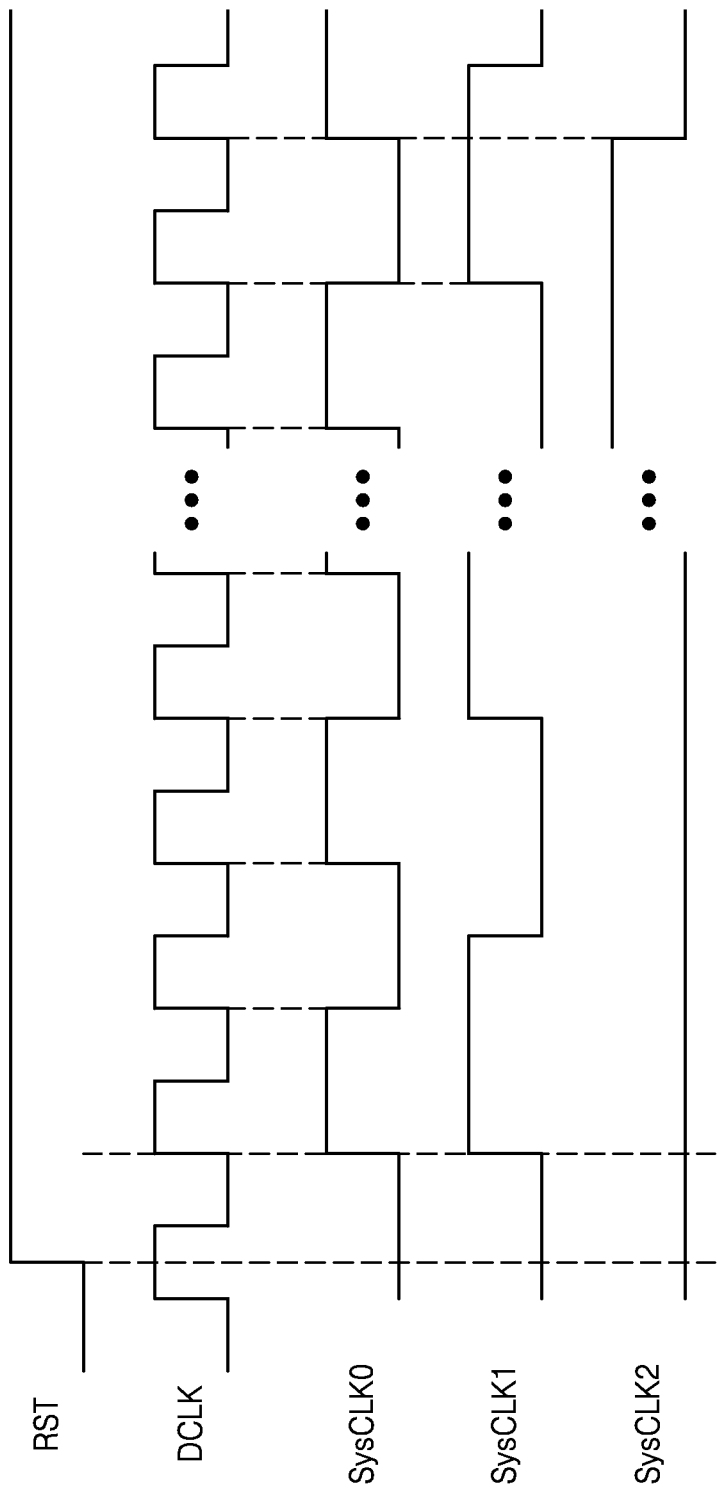
FIG. 6 is a waveform diagram of a plurality of system clock signals of FIG. 5.

The AFE 30-1 may further generate a plurality of system clock signals SysCLK0, SysCLK1, and SysCLK2 in addition to a sampling clock signal ADCCLK. No skew exists between the sampling clock signal ADCCLK and each of the plurality of system clock signals SysCLK0, SysCLK1, and SysCLK2, as shown in FIG. 6. For example, a rising edge (or a falling edge) of the sampling clock signal ADCCLK and a rising edge (or a falling edge) of each of the plurality of system clock signals SysCLK0, SysCLK1, and SysCLK2 are aligned in terms of time. The sampling clock signal ADCCLK and each of the plurality of system clock signals SysCLK0, SysCLK1, and SysCLK2 may be described as synchronized with each other. The demodulator 40-1 may demodulate the digital code AFE_OUT using at least one of the sampling clock signal ADCCLK and the plurality of system clock signals SysCLK0, SysCLK1, and SysCLK2.

Figure 5:
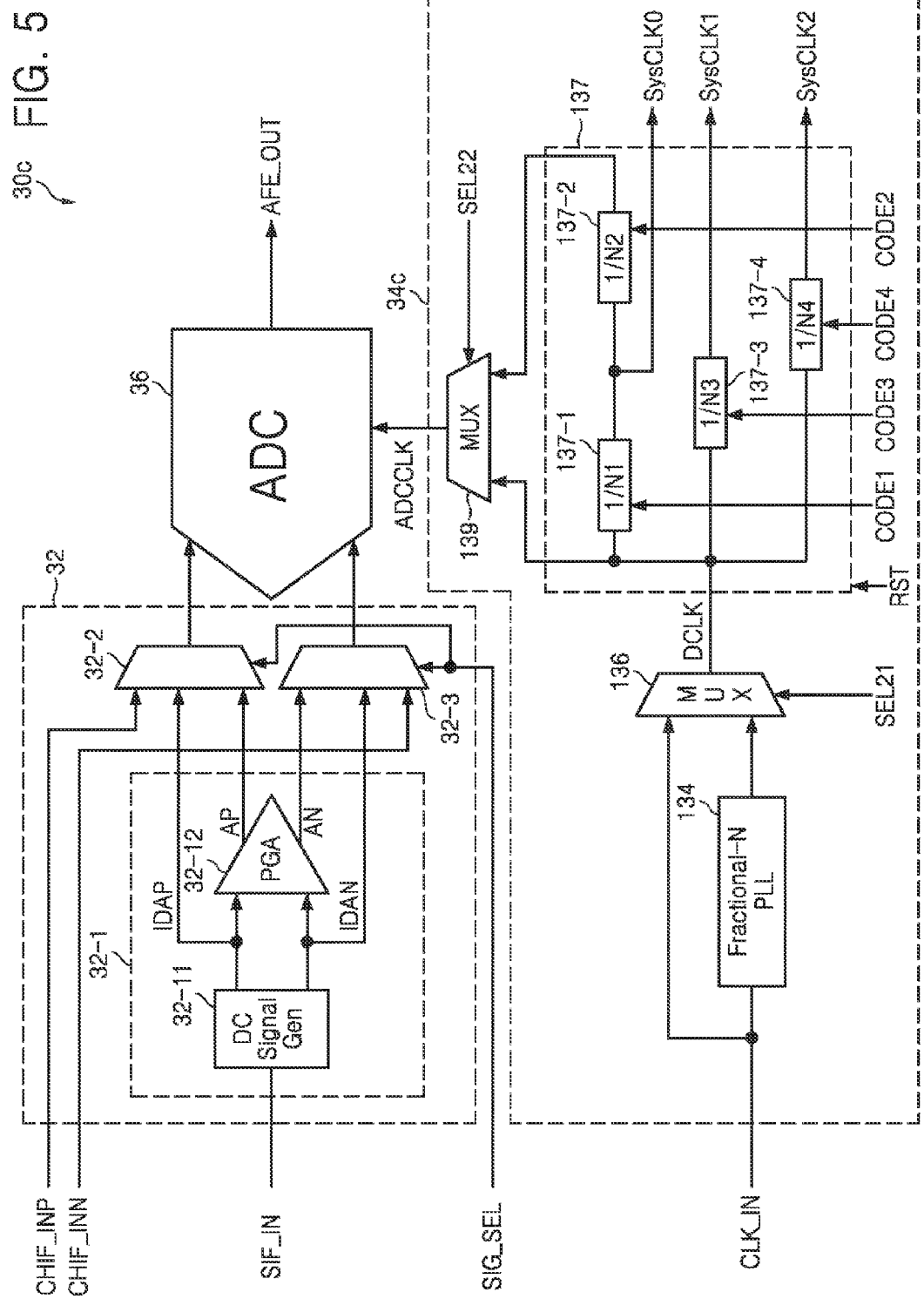
FIG. 5 is a block diagram of an analog front end of FIG. 4, according to an exemplary embodiment.

FIG. 5 is a block diagram of the AFE 30-1 of FIG. 4, according to an exemplary embodiment. Referring to FIGS. 2 and 5, except for a second selection circuit or second processing circuit 34c of FIG. 5, the structure of the AFE 30c of FIG. 5 is substantially the same as or similar to that of the AFE 30a of FIG. 2.

The second selection circuit 34c includes a fractional-N PLL 134, a first selector 136, a deskew frequency divider 137, and a second selector 139. For example, each of the selectors 136 and 139 may be embodied by a multiplexer.

The fractional-N PLL 134 may receive the source clock signal CLK_IN as an input clock signal and generate a clock signal.

The first selector 136, in response to a selection signal SEL21, selectively outputs any one of the source clock signal CLK_IN and the output clock signal of the fractional-N PLL 134. The deskew frequency divider 137 divides a frequency of a clock signal DCLK output from the first selector 136 and generates the plurality of system clock signals SysCLK0, SysCLK1, and SysCLK2 having no skew between each other.

The frequencies of the plurality of system clock signals SysCLK0, SysCLK1, and SysCLK2 are different from each other.

The deskew frequency divider 137 includes a first frequency divider 137-1 and a second frequency divider 137-2. The first frequency divider 137-1 divides a frequency of the DCLK of the first selector 136 by a first division ratio N1 and generates a first system clock signal SysCLK0 having a divided frequency. The second frequency divider 137-2 divides a frequency of the output clock signal of the first frequency divider 137-1 by a second division ratio N2.

The first division ratio N1 that is a natural number may be adjusted according to a first code CODE1 that is externally input, and the second division ratio N2 that is a natural number may be adjusted according to a second code CODE2 that is externally input.

The deskew frequency divider 137 may further include a third frequency divider 137-3 and a fourth frequency divider 137-4. The third frequency divider 137-3 divides a frequency of the clock signal DCLK of the first selector 136 by a third division ratio N3 and generates a second system clock signal SysCLK1 having a divided frequency. The fourth frequency divider 137-4 divides a frequency of the clock signal DCLK of the first selector 136 by a fourth division ratio N4 and generates a third system clock signal SysCLK3 having a divided frequency.

The third division ratio N3 that is a natural number may be adjusted according to a third code CODE3 that is externally input, and the fourth division ratio N4 that is a natural number may be adjusted according to a fourth code CODE4 that is externally input. Each of the division ratios N1-N4 may be reset or initialized by a reset signal RST.

Although FIG. 5 illustrates the deskew frequency divider 137 that generates three system clock signals SysCLK0, SysCLK1, and SysCLK2 for convenience of explanation, in some exemplary embodiments, the deskew frequency divider 137 may include a plurality of frequency dividers, each being capable of dividing a frequency of the clock signal DCLK of the first selector 136 by different division ratios.

The second selector 139, in response to a second selection signal SEL22, outputs the clock signal DCLK output from the first selector 136 or the clock signal output from the second frequency divider 137-2 as the sampling clock signal ADCCLK. Thus, the ADC 36, in response to the sampling clock signal ADCCLK output from the second selector 139, may convert the output signals CHIF_INP and CHIF_INN, AP and AN, or IDAP and IDAN output from the first selection circuit 32, to the digital code AFE_OUT.

Referring to FIGS. 4 and 5, the plurality of clock signals ADCCLK, SysCLK0, SysCLK1, and SysCLK2 may be supplied to the demodulator 40-1. The demodulator 40-1 may demodulate the digital code AFE_OUT using at least one of the plurality of clock signals ADCCLK, SysCLK0, SysCLK1, and SysCLK2 output from the AFE 30-1.

In some exemplary embodiments, at least one of the plurality of clock signals ADCCLK, SysCLK0, SysCLK1, and SysCLK2 output from the AFE 30-1, that is, the second selection circuit 34c, may be used as an operation clock signal of the decoder 50 or an operation clock signal of an internal circuit (not shown) embodied in the DTV system 10.

FIG. 6 is a waveform diagram of the system clock signals of FIG. 5. FIG. 6 shows waveforms of the system clock signals when the first division ratio N1 is 2, the second division ratio N2 is 3, and the fourth division ratio N4 is 1024.

In some exemplary embodiments, each of the frequency dividers 137-1 to 137-4 may include a plurality of sub-frequency dividers (not shown) having different frequency division ratios. An output signal of each of the sub-frequency dividers may be selectively output according to each code CODE1 to CODE4.

Figure 7:
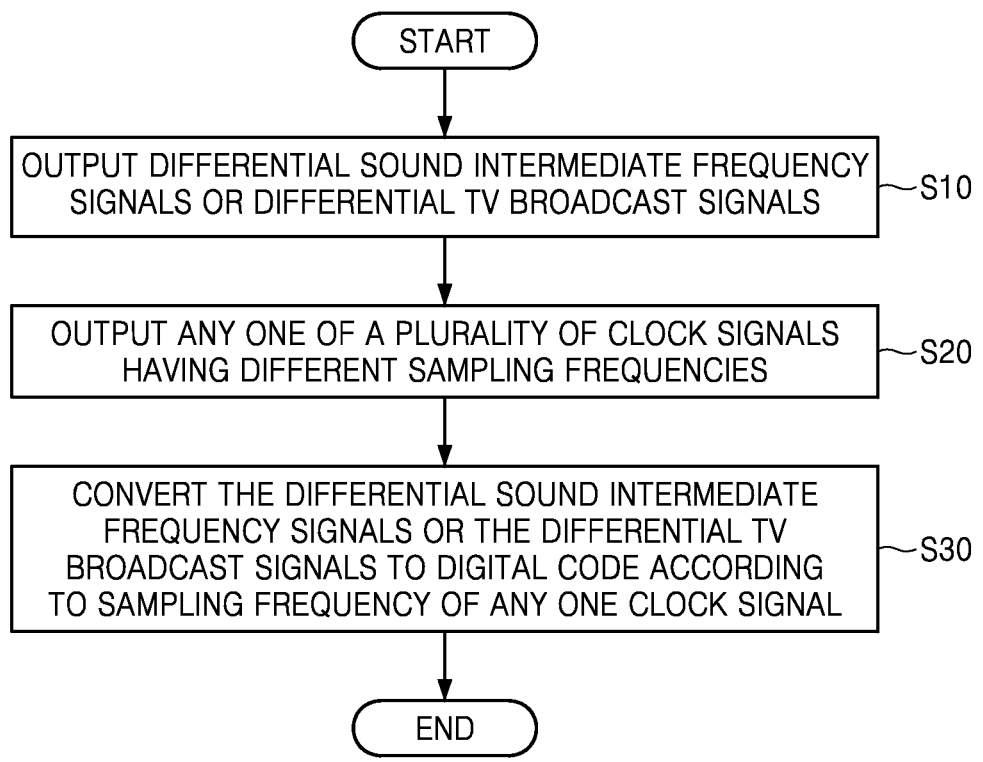
FIG. 7 is a flowchart for explaining a method of operating the analog front end of FIG. 1.

FIG. 7 is a flowchart for explaining a method of operating the analog front end 30 of FIG. 1. Referring to FIGS. 1 to 7, the first selection circuit 32 outputs the differential sound intermediate frequency signals AP and AN or the IDAP and IDAN, or the differential TV broadcast signals CHIF_INP and CHIF_INN according to the first selection signal SIG_SEL (operation S10).

The second selection circuit 34a, 34b, or 34c may selectively output any one of a plurality of clock signals having different sampling frequencies according to the selection signal SEL2, SEL11, or SEL22 (operation S20). The ADC 36 may convert the differential sound intermediate frequency signals AP and AN or the IDAP and IDAN, or the differential TV broadcast signals CHIF_INP and CHIF_INN output from the first selection circuit 32, to the digital code AFE_OUT, according to a sampling frequency of a clock signal that is selectively output by the second selection circuit 34a, 34b, or 34c (operation S30).

Figure 8:
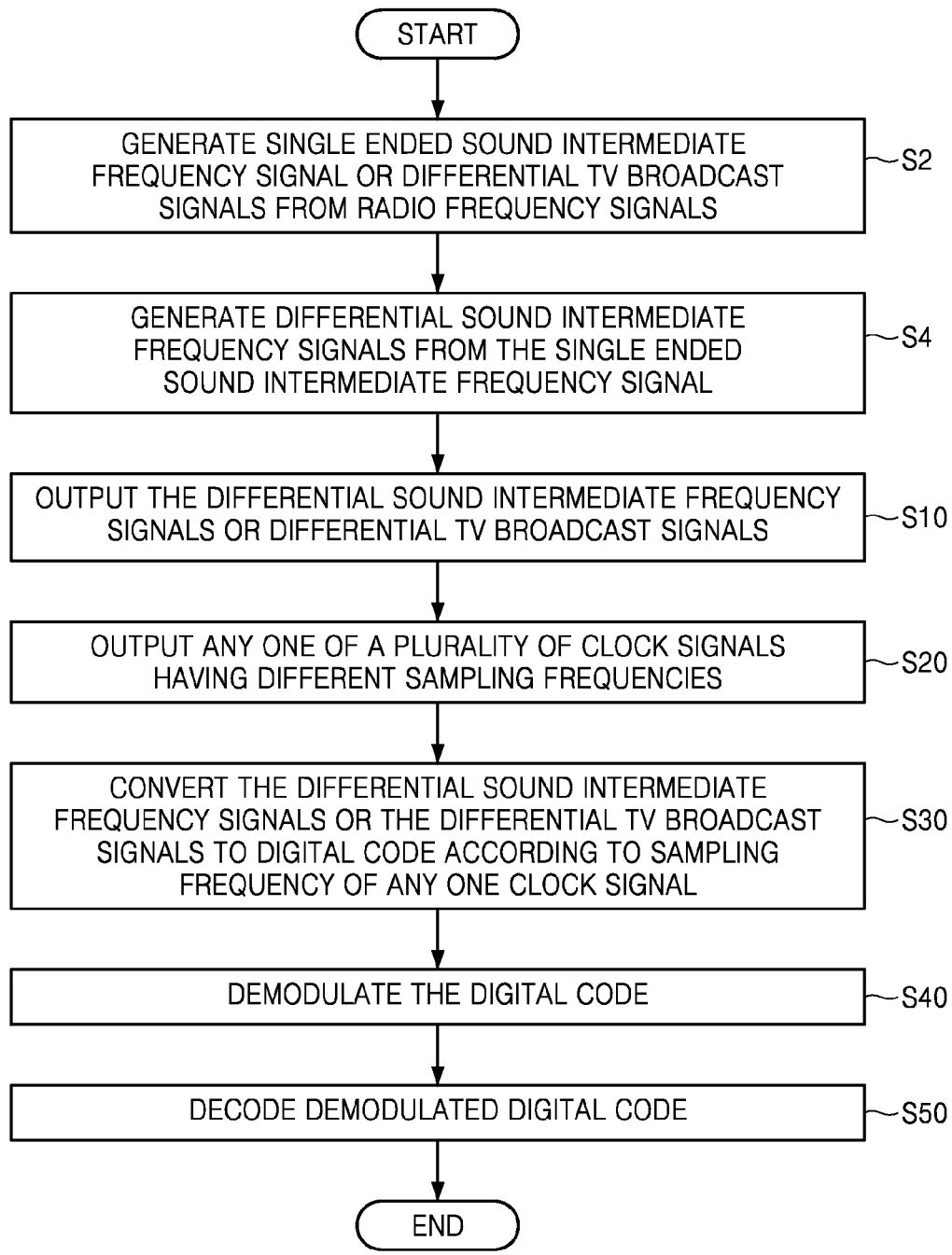
FIG. 8 is a flowchart for explaining a method of operating the DTV system of FIG. 1.

FIG. 8 is a flowchart for explaining a method of operating the DTV system 10 of FIG. 1. Referring to FIGS. 1 to 8, an operation method of the DTV system 10 including the tuner 20 that generates the single-ended sound intermediate frequency signal SIF_IN and/or the differential TV broadcast signals CHIF_INP and CHIF_INN from radio frequency (RF) signals and the AFE 30 that generates the digital code AFE_OUT from the single-ended sound intermediate frequency signal SIF_IN or the differential TV broadcast signals CHIF_INP and CHIF_INN.

The tuner 20 generates the single-ended sound intermediate frequency signal SIF_IN and/or the differential TV broadcast signals CHIF_INP and CHIF_INN from the RF signals (operation S2). The single-to-differential converter 32-1 of the AFE 30 generates the differential sound intermediate frequency signals AP and AN, or the IDAP and IDAN from the single-ended sound intermediate frequency signal SIF_IN (operation S4).

The first selection circuit 32 selectively outputs the differential sound intermediate frequency signals AP and AN or the IDAP and IDAN, or the differential TV broadcast signals CHIF_INP and CHIF_INN to the ADC 36 according to the first selection signal SIG_SEL (operation S10). The second selection circuit 34a, 34b, or 34c may selectively output any one of a plurality of clock signals having different sampling frequencies according to the selection signal SEL2, SEL11, or SEL22 (operation S20).

The ADC 36 may convert the differential sound intermediate frequency signals AP and AN or the IDAP and IDAN, or the differential TV broadcast signals CHIF_INP and CHIF_INN output from the first selection circuit 32 to the digital code AFE_CODE according to a sampling frequency of the clock signal selectively output by the second selection circuit 34a, 34b, or 34c (operation S30).

The demodulator 40 demodulates the digital code AFE_OUT (operation S40) and the decoder 50 decodes the demodulated digital code (operation S50).

Figure 9:
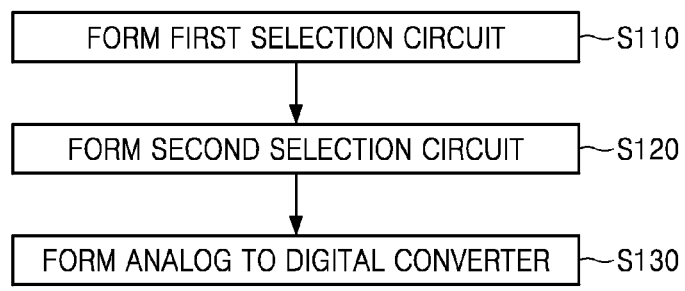
FIG. 9 is a flowchart for explaining a method of manufacturing the analog front end of FIG. 1.

FIG. 9 is a flowchart for explaining a method of manufacturing the analog front end of FIG. 1. Referring to FIGS. 1, 2, 3, 5, and 9, the method of manufacturing the AFE 30 of a DTV is described as follows.

The first selection circuit 32 for outputting the differential sound intermediate frequency signals AP and AN or the IDAP and IDAN, or the differential TV broadcast signals CHIF_INP and CHIF_INN, for example, according to a signal SIG_SEL determining an operation mode, is formed or provided in a first region of a semiconductor substrate (operation S110).

The second selection circuit 34a, 34b, or 34c for selectively outputting any one of a plurality of clock signals having different sampling frequencies according to the selection signal SEL2, SEL22, or SEL22 is formed or provided in a second region of the semiconductor substrate (operation S120).

The ADC 36 for converting the output signals of the first selection circuit 32 to the digital code AFE_OUT according to a sampling frequency of the clock signal output from the second selection circuit 34a, 34b, or 34c is formed or provided in a third region of the semiconductor substrate (operation S130).

The operations S110, S120, and S130 are separated for convenience of explanation, and each of the operations S110, S120, and S130 may be performed simultaneously or at different times according to a manufacturing process of the AFE 30. At least a part of the first region, at least a part of the second region, and/or at least a part of the third region may be horizontally or vertically overlapped with one another.

Figure 10:
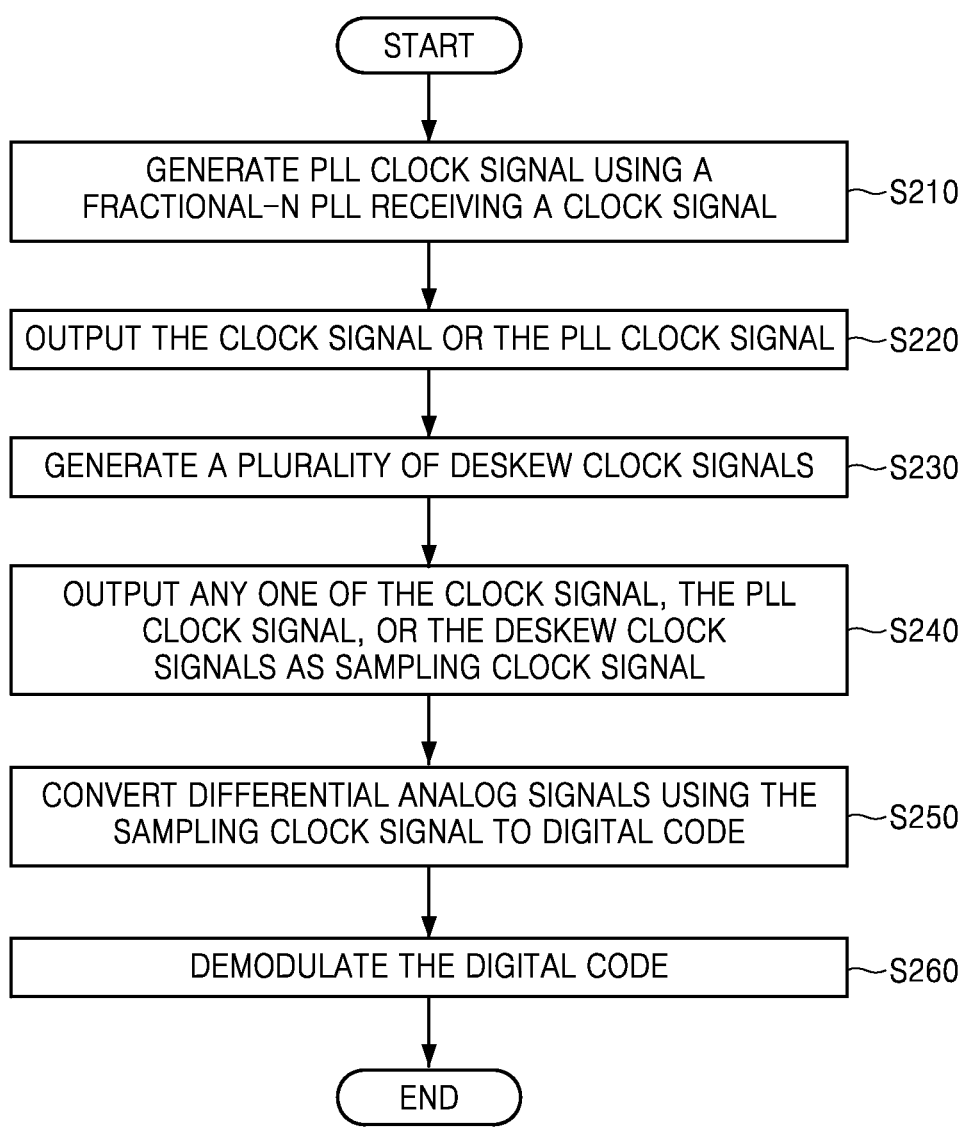
FIG. 10 is a flowchart for explaining an operation of the DTV system of FIG. 4.

FIG. 10 is a flowchart for explaining an operation of the DTV system 10a of FIG. 4. The operation of the DTV system 10a is described as follows with reference to FIGS. 4, 5, 6, and 10.

The fractional-N PLL 134 generates a PLL clock signal using the source clock signal CLK_IN (operation S210). The first selector 136, in response to the selection signal SEL21, selectively outputs any one of the source clock signal CLK_IN and the PLL clock signal (operation S220). As shown in FIG. 3 or 5, the clock signal output from the selection circuit 113 or 136 my be used as a sampling clock signal of the ADC 36.

The deskew frequency divider 137 generates a plurality of system clock signals having no skew therebetween, for example, the deskew system clock signals SysCLK0, SysCLK1, and SysCLK2, using the clock signal DCLK output from the first selector 136, a shown in FIG. 6 (operation S230). A rising edge (or a falling edge) of each of the system clock signals SysCLK0, SysCLK1, and SysCLK2 and a rising edge (or a falling edge) of the clock signal DCLK output from the first selector 136 are aligned in terms of time. Thus, no skew exists between each of the system clock signals SysCLK0, SysCLK1, and SysCLK2 and the clock signal DCLK output from the first selector 136.

The second selector 139, in response to the selection signal SEL22, outputs the clock signal DCLK output from the first selector 136 or the clock signal of the first frequency divider 137-2 as the sampling clock signal ADCCLK (operation S240). The ADC 36 converts the differential analog signals to an M-bit digital code AFE_OUT using the sampling clock signal ADCCLK (operation S250). The demodulator 40-1 demodulates the M-bit digital code AFE_OUT using at least one of the clock signals ADCCLK, SysCLK0, SysCLK1, and SysCLK2 output from the AFE 30-1 (operation S260).

As described above with reference to FIG. 3, the signal processing circuit including the fractional-N PLL 111, the selection circuit 113, and the ADC 36 may be applied to all signal processing circuits that are capable of converting analog differential signals to a digital code using the sampling clock signal ADCCLK. The demodulator included in the signal processing circuit may demodulate the digital code output from the ADC 36 using the sampling clock signal ADCCLK.

Also, as described above with reference to FIG. 5, the signal processing circuit including the fractional-N PLL 134, the deskew frequency divider 137, the selection circuits 136 and 139, and the ADC 36 may be applied to all signal processing circuits that are capable of converting analog differential signals to a digital code using the sampling clock signal ADCCLK.

The demodulator included in the signal processing circuit may demodulate the digital code output from the ADC 36 using at least one of the clock signals ADCCLK, SysCLK0, SysCLK1, and SysCLK2 output from the deskew frequency divider 137. The analog front end according to exemplary embodiments has an effect of selectively processing the sound intermediate frequency signal, the differential DTV broadcast signals, and the differential analog TV broadcast signals according to an operation mode. Also, the analog front end including a phase locked loop has an effect of generating a sampling frequency including low jitter that may be commonly used for various DTV standards.

The analog front end according to exemplary embodiments has an effect of simultaneously generating various system clock signals used in a DTV system and a sampling clock signal that may convert the differential analog signals to a digital code.

While exemplary embodiments have been particularly shown and described above, it will be understood that various changes in form and details may be made therein without departing from the spirit and scope of present inventive concept.

What is claimed is:

1. An analog front end (AFE) of a digital TV processing system, the AFE comprising:
    a first selection circuit which outputs differential sound intermediate frequency signals or differential TV broadcast signals in response to a first selection signal;
    a second selection circuit which outputs a clock signal among a plurality of clock signals having different sampling frequencies, in response to a second selection signal; and
    an analog-to-digital converter which converts the output signals output from the first selection circuit to a digital code, according to a sampling frequency of the output clock signal output from the second selection circuit.

2. The AFE of claim 1, wherein the first selection circuit comprises:
    a single-to-differential converter which converts a single-ended sound intermediate frequency signal to the differential sound intermediate frequency signals;
    a first multiplexer which selectively outputs any one of the differential sound intermediate frequency signals and any one of the differential TV broadcast signals, in response to the first selection signal; and
    a second multiplexer which selectively outputs another one of the differential sound intermediate frequency signals and another one of the differential TV broadcast signals, in response to the first selection signal.

3. The AFE of claim 2, wherein the single-to-differential converter comprises:
    a direct current (DC) signal generator which sets a DC level on the single-ended sound intermediate frequency signal and outputs first differential sound intermediate frequency signals on which DC levels are set; and
    a programmable gain amplifier (PGA) which adjusts gains of the output first differential sound intermediate frequency signals and outputs the gain-adjusted differential sound intermediate frequency signals.

4. The AFE of claim 2, wherein the single-to-differential converter sets a DC level on the single-ended sound intermediate frequency signal and outputs the differential sound intermediate frequency signals on which DC levels are set.

5. The AFE of claim 1, wherein the second selection circuit comprises:
    a frequency divider which divides a frequency of a source clock signal;
    a first multiplexer which outputs the source clock signal or a clock signal output from the frequency divider, in response to a clock selection signal;
    a phase locked loop (PLL) which receives a clock signal output from the first multiplexer as an input clock signal; and
    a second multiplexer which outputs the output clock signal output from the first multiplexer or a clock signal output from the PLL, in response to the second selection signal.

6. The AFE of claim 1, wherein the second selection circuit comprises:
    a first frequency divider which divides a frequency of a source clock signal;
    a first multiplexer which outputs the source clock signal or a clock signal output from the first frequency divider, in response to a clock selection signal;
    a phase locked loop (PLL) which receives a clock signal output from the first multiplexer as an input clock signal;
    a second frequency divider which divides a frequency of a clock signal output from the PLL; and
    a second multiplexer which selectively outputs the clock signal output from the first multiplexer, a clock signal output from the second frequency divider, or the clock signal output from the PLL, in response to the second selection signal.

7. The AFE of claim 1, wherein frequencies of the differential TV broadcast signals and the sampling frequency of the output clock signal output from the second selection circuit are appropriate for an advanced television system committee (ATSC) standard or an ATSC-mobile/handheld (ATSC-M/H) standard.

8. The AFE of claim 1, wherein frequencies of the differential TV broadcast signals and the sampling frequency of the output clock signal output from the second selection circuit are appropriate for a national television system committee (NTSC) standard.

9. The AFE of claim 1, wherein the differential TV broadcast signals comprise differential analog TV broadcast signals or differential digital TV broadcast signals.

10. The AFE of claim 1, wherein the first selection signal corresponds to an operation mode.

11. A digital TV processing system comprising:
    a tuner which generates at least one of a single-ended sound intermediate frequency signal and differential TV broadcast signals from radio frequency signals;
    an analog front end (AFE) which selectively processes the generated single-ended sound intermediate frequency signal and the generated differential TV broadcast signals; and
    a demodulator which demodulates a digital code output from the AFE,
    wherein the AFE comprises:
        a first selection circuit which outputs differential sound intermediate frequency signals generated based on the generated single-ended sound intermediate frequency signal or the generated differential TV broadcast signals, in response to a first selection signal;
        a second selection circuit which outputs a clock signal among a plurality of clock signals having different sampling frequencies, in response to a second selection signal; and
        an analog-to-digital converter which converts the output signals output from the first selection circuit to the digital code, according to a sampling frequency of the output clock signal output from the second selection circuit.

12. The digital TV processing system of claim 11, wherein the second selection circuit comprises:
a frequency divider which divides a frequency of a source clock signal;
a first multiplexer which outputs the source clock signal or a clock signal output from the frequency divider, in response to a clock selection signal;
a phase locked loop (PLL) which receives a clock signal output from the first multiplexer as an input clock signal; and
a second multiplexer which outputs the output clock signal output from the first multiplexer or a clock signal output from the PLL, in response to the second selection signal.

13. The digital TV processing system of claim 11, wherein the AFE and the demodulator are integrated in a single integrated circuit (IC).

14. A signal processing method of a digital TV processing system, the signal processing method comprising:
selectively outputting differential sound intermediate frequency signals or differential TV broadcast signals in response to a first selection signal;
outputting a clock signal among a plurality of clock signals having different sampling frequencies, in response to a second selection signal; and
converting the output signals output from the selectively outputting to a digital code, according to a sampling frequency of the output clock signal.

15. The signal processing circuit of claim 14, wherein the selectively outputting comprises:
converting a single-ended sound intermediate frequency signal to the differential sound intermediate frequency signals;
selectively outputting any one of the differential sound intermediate frequency signals and any one of the differential TV broadcast signals, in response to the first selection signal; and
selectively outputting another one of the differential sound intermediate frequency signals and another one of the differential TV broadcast signals, in response to the first selection signal.

16. The signal processing circuit of claim 15, wherein the converting the single-ended sound intermediate frequency signal comprises:
setting a direct current (DC) level on the single-ended sound intermediate frequency signal and outputting first differential sound intermediate frequency signals on which DC levels are set; and
adjusting gains of the output first differential sound intermediate frequency signals and outputting the gain-adjusted differential sound intermediate frequency signals.

17. The signal processing circuit of claim 15, wherein the converting the single-ended sound intermediate frequency signal comprises setting a DC level on the single-ended sound intermediate frequency signal and outputting the differential sound intermediate frequency signals on which DC levels are set.

18. The signal processing circuit of claim 14, wherein the outputting the clock signal among the plurality of clock signals comprises:
dividing a frequency of a source clock signal;
outputting, by a first multiplexer, the source clock signal or a clock signal output from the dividing the frequency, in response to a clock selection signal;
receiving, by a phase locked loop (PLL), a clock signal output from the first multiplexer as an input clock signal; and
outputting, by a second multiplexer, the output clock signal output from the first multiplexer or a clock signal output from the PLL, in response to the second selection signal.

19. The signal processing method of claim 14, wherein the outputting the clock signal among the plurality of clock signals comprises;
dividing a frequency of a source clock signal;
outputting, by a first multiplexer, the source clock signal or a clock signal output from the dividing the frequency, in response to a clock selection signal;
receiving, by a phase locked loop (PLL), a clock signal output from the first multiplexer as an input clock signal;
dividing, by a frequency divider, a frequency of a clock signal output from the PLL; and
selectively outputting, by a second multiplexer, the clock signal output from the first multiplexer, a clock signal output from the frequency divider, or the clock signal output from the PLL, in response to the second selection signal.

20. The signal processing method of claim 14, wherein frequencies of the differential TV broadcast signals and the sampling frequency of the output clock signal are appropriate for an advanced television system committee (ATSC) standard or an ATSC-mobile/handheld (ATSC-M/H) standard.

21. The signal processing method of claim 14, wherein frequencies of the differential TV broadcast signals and the sampling frequency of the output clock signal are appropriate for a national television system committee (NTSC) standard.

22. A method of manufacturing an analog front end (AFE) of a digital TV processing system, the method comprising:
providing, in a first region of a semiconductor substrate, a first selection circuit for outputting differential sound intermediate frequency signals or differential TV broadcast signals in response to a first selection signal;
providing, in a second region of the semiconductor substrate, a second selection circuit for outputting a clock signal among a plurality of clock signals having different sampling frequencies, in response to a second selection signal; and
providing, in a third region of the semiconductor substrate, an analog-to-digital converter for convening the output signals output from the first selection circuit to a digital code, according to a sampling frequency of the output clock signal output from the second selection circuit.

* * * * *